Patented Oct. 4, 1949

2,483,998

UNITED STATES PATENT OFFICE 2,483,998

N-(PYRROLIDYLALKYL)-PHENOTHIAZINES

James H. Hunter and William Bradley Reid, Jr., Kalamazoo, Mich., assignors to The Upjohn Company, Kalamazoo, Mich., a corporation of Michigan No Drawing. Application September 15, 1947, Serial No. 774,177

10 Claims. (Cl. 260—243)

The present invention relates to a new group of chemical compounds which are N-(pyrrolidylalkyl)-phenothiazines and may be represented by the formula:

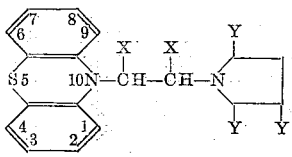

wherein X attached to the carbon chain is selected from the group consisting of hydrogen and lower-alkyl radical, and Y attached to the pyrrolidine ring represents a hydrogen or methyl radical, at least one of the said radicals X and Y being other than hydrogen.

It is an object of the present invention to provide a novel group of compounds which are useful therapeutically. A further object is the provision of a process for the production of the said compounds. Other objects of the invention will become apparent hereinafter.

Members of this new class of compounds and their salts have been prepared and identified. The free bases herein concerned are solids or viscous liquids which are distillable at low pressures, soluble in common organic solvents, and slightly soluble in water.

By virtue of the amino nitrogen atom common to the compounds of this invention, they are all basic substances and readily form stable salts with acids such as hydrochloric, sulfuric, acetic, oxalic, tartaric, ascorbic, citric, et cetera, in a manner well known to the art. Quaternary ammonium salts may also be prepared, for example, the methobromide, ethochloride, ethyl paratoluenesulfonate, et cetera, by reaction of the free base with a suitable alkyl halide or arylsulfonic ester. Many of the salts such as the hydrochloride, sulfate, or oxalate are colorless solids soluble in water. The pharmacology of the claimed compounds of this invention has been studied and the results obtained from use of the compounds as antihistaminics have been described in articles by Samuel M. Feinberg, Bengt Noren and Robert H. Feinberg, in Journal of Allergy, March 1948, vol. 19, pages 90 to 99, and Milton J. Vander Brook, Kenneth J. Olson, Marilyn T. Richmond and Marvin H. Kuizenga, in The Journal of Pharmacology and Experimental Therapeutics, October 1948, vol. 94, No. 2, pages 197 to 208.

The new compounds may be prepared by the condensation of a pyrrolidino-alkyl halide with phenothiazine in the presence of a suitable condensing agent. Beta-pyrrolidinoisopropyl, beta-pyrrolidinopropyl, beta(2,4 - dimethylpyrrolidino) - ethyl, beta-(2,5 - dimethylpyrrolidino) - ethyl, beta-(2,4-dimethylpyrrolidino)-isopropyl, beta-(2,5-dimethylpyrrolidino)-isopropyl, beta-(2-methylpyrrolidino)-isopropyl, beta-(4-methylpyrrolidino)-ethyl, beta-pyrrolidinobutyl, beta-pyrrolidinoisobutyl, and beta-pyrrolidino-n-octyl halides are representative of the group of halides which may be used to prepare the products of the present invention. The pyrrolidinoalkyl halide hydrohalides may be prepared by the treatment of the corresponding alcohol with thionyl chloride or bromide, and the alcohols themselves may be prepared according to known procedure, e. g., by the condensation of an alkylene oxide or an alkylene halohydrin with the selected pyrrolidine. Among the halides, chlorides and bromides are preferred because of ease of preparation, reactivity, and stability. Certain of the beta-pyrrolidinoalkyl halides have been described and claimed and their method of preparation described in the application of William B. Reid, Jr., Serial No. 773,521, filed September 11, 1947.

The hydrogen on the nitrogen of phenothiazine is replaced by the alkali metal, giving the alkali metal salt of phenothiazine which is then reacted with the desired beta-pyrrolidinoalkyl halide prepared from the hydrohalide by known procedure, there resulting from the reaction an alkalimetal halide and a N-(beta-pyrrolidinoalkyl)-phenothiazine. Alkalimetals, alkalimetal amides, alkalimetal hydrides, alkalimetal hydroxides, and alkalimetal carbonates, such as sodium amide, sodium hydride, lithium amide, powdered sodium hydroxide, potassium carbonate, et cetera, may be used as condensing agents, with the alkalimetal amides being preferred. The condensation is preferably carried out in an aromatic hydrocarbon solvent such as benzene, toluene, or xylene, and at a temperature at or near the boiling point of the particular solvent employed, which is ordinarily between about 80 and about 150 degrees centigrade.

The mechanism of alkylations wherein a halogen alkylamine is the alkylating agent is believed to proceed through an intermediate ethyleneimmonium ion. When a pyrrolidinoethyl halide is used, the formula of the intermediate ion may be represented as:

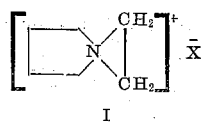

I

An examination of the positive portion will show that, irrespective of which of the bonds between the nitrogen and the —CH₂— of the ethylene group is opened during the reaction, the same product will be formed. When a pyrrolidinoalkyl halide of more than two carbon atoms is used, the formula of the intermediate may be postulated to be:

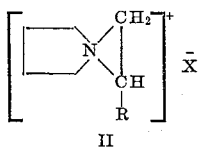

wherein R is a lower-alkyl, e. g., methyl, ethyl, propyl, isopropyl, butyl, isobutyl, or hexyl radical. An examination of the positive portion will show that, dependent upon which of the bonds between the nitrogen and the —CH$_2$— of the alkylene group is opened during alkylation, one of two groups, the formulas of which are indicated below, will be introduced:

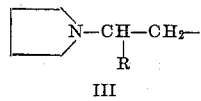

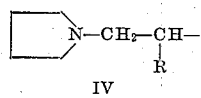

Both of these two possibilities will result independent of which halide is used for the purpose of alkylation.

The following examples are given to illustrate the practice of the present invention and are in no way to be construed as limiting.

*Preparation 1.—Beta-(2,5-dimethylpyrrolidino)-ethanol*

Twenty-nine grams of ethylene oxide was added to a solution of 49.5 grams of 2,5-dimethylpyrrolidine in 50 milliliters of absolute methanol. The rate of addition was so regulated as to maintain the temperature of the reaction mixture between 55 and 65 degrees centigrade. After the addition of ethylene oxide, methanol was removed by distillation and the residual oil fractionated under reduced pressure to give 53 grams of beta-(2,5-dimethylpyrrolidino)-ethanol, boiling point (uncorr.) 113–116 degrees centigrade at a pressure of 62 millimeters of mercury.

*Preparation 2.—Beta-(2,4-dimethylpyrrolidino)-ethanol*

Twenty-one grams of ethylene oxide was added to a solution of 39.6 grams of 2,4-dimethylpyrrolidine dissolved in 50 milliliters of absolute methanol at such a rate that the temperature of the reaction mixture was maintained between 55 and 65 degrees centigrade during the addition. Methanol was then removed by distillation. Fractionation of the residue gave 44.6 grams of beta-(2,4-dimethylpyrrolidino)-ethanol, boiling at 117 degrees centigrade (uncorr.) at a pressure of 73 millimeters of mercury and having an $N_D^{25}$ of 1.4573.

*Preparation 3.—1-(2',4'-dimethylpyrrolidino)-propanol-2*

Fifty-one grams of 1-chloropropanol-2 was added dropwise to a stirred solution of 65.4 grams of 2,4-dimethylpyrrolidine in 70 milliliters of water containing 28 grams of sodium hydroxide. The temperature of the reaction was maintained between 40 and 50 degrees centigrade during the addition of 1-chloropropanol-2. After the mixture had been allowed to stand for eighteen hours, 50 grams of solid sodium hydroxide was added, and solution was effected by stirring. The crude aminoalcohol was extracted from the cooled, basified solution with ether, and the ether solution dried with solid potassium hydroxide. After removal of the ether, distillation through a column under reduced pressure gave 65.0 grams of 1-(2',4'-dimethylpyrrolidino)-propanol-2, boiling at 118–119 degrees centigrade (uncorr.) at a pressure of 83 millimeters of mercury and having an $N_D^{25}$ of 1.4451.

*Preparation 4.—1-(2',5'-dimethylpyrrolidino)-propanol-2*

Seventy grams of 1-chloropropanol-2 was added dropwise to a stirred solution of 89.2 grams of 2,5-dimethylpyrrolidine in 100 milliliters of water containing 40 grams of sodium hydroxide. The temperature of the reaction mixture was kept at 40 degrees centigrade during addition of the propylene chlorohydrin. After stirring for an additional five hours, the mixture was allowed to stand for eighteen hours. Fifty-seven grams of solid sodium hydroxide was added to the reaction mixture, solution of the base being aided by stirring. When the solution had cooled, the crude aminoalcohol was extracted with ether and the ether solution dried with solid sodium hydroxide. After removal of the ether, distillation through a short column packed with glass helices gave 83 grams of 1-(2',5'-dimethylpyrrolidino)-propanol-2, boiling at 107–108 degrees centigrade (uncorr.) at a pressure of 50 millimeters of mercury.

*Preparation 5.—1-pyrrolidinopropanol-2*

Seventy-seven grams (0.82 mole) of propylene chlorohydrin was added dropwise to a stirred solution of 106.7 grams (1.5 moles) of pyrrolidine in 220 milliliters of water containing 35 grams (0.875 mole) of sodium hydroxide. The temperature of the reaction mixture was kept at 40 degrees centigrade during the addition of the 1-chloropropanol-2. After stirring for an additional two hours, the mixture was allowed to stand eighteen hours, 50 grams of solid sodium hydroxide added, and solution effected by stirring. When cool, the upper layer of the crude aminoalcohol was separated and dried over solid sodium hydroxide. Distillation through a Widmer column gave 54.0 grams of 1-pyrrolidinopropanol-2; boiling point 116–117 degrees centigrade (uncorr.) at 110 millimeters of mercury; $N_D^{21}$, 1.4593.

*Preparation 6.—Beta-(2,4-dimethylpyrrolidino)-ethyl chloride*

Twenty-eight and eight tenths grams of pure thionyl chloride was added to a stirred solution of 34.4 grams of beta-(2,4-dimethylpyrrolidino)-ethanol in 100 milliliters of dry chloroform. The chloroform solution was cooled and the thionyl chloride added at such a rate as to maintain the temperature of the reaction mixture below 20 degrees centigrade. After the addition of thionyl chloride, the reaction mixture was stirred for an additional three hours. Ten milliliters of methanol was added, after which the solvent was removed under reduced pressure. The crude aminoethyl chloride hydrochloride was dissolved in a minimum quantity of water, filtered, and the filtrate basified with a very concentrated solution of sodium hydroxide in water. The resulting oil was separated, dried over solid potassium hydroxide and distilled under reduced pressure. There was thus obtained 11.4 grams of beta-(2,4-dimethylpyrrolidino)-ethyl chloride, distilling at 118–120 degrees centigrade (uncorr.) at a pressure of 106 millimeters of mercury.

The hydrochloride was obtained by treating an ethereal solution of the base with dry hydrogen chloride. After crystallization from absolute isopropanol, beta-(2,4-dimethylpyrrolidino)-ethyl chloride hydrochloride, the product had a melting point (with decomposition) of 201.5–202.5 degrees centigrade (uncorr.).

*Preparation 7.—1-(2',4'-dimethylpyrrolidino)-2-chloropropane*

In a manner similar to that of Preparation 6, there was obtained from 47.6 grams of pure thionyl chloride and 50.4 grams of 1-(2,4-dimethylpyrrolidino)-propanol-2 dissolved in 100 milliliters of dry chloroform, 40.0 grams of 1-(2',4'-dimethylpyrrolidino)-2-chloropropane, boiling at 117–119 degrees centigrade at a pressure of 98 millimeters of mercury.

The hydrochloride, prepared as in Preparation 6, after crystallization from an isopropanol-ether mixture, sintered at 114–116 degrees centigrade and melted at 125–126 degrees centigrade.

*Preparation 8.—Beta-(2,5-dimethylpyrrolidino)-ethyl chloride*

In a manner similar to that of Preparation 6, there was obtained from 32.8 grams of thionyl chloride and 35.8 grams of beta-(2,5-dimethylpyrrolidino)-ethanol dissolved in 100 milliliters of pure chloroform, 26.9 grams of beta-(2,5-dimethylpyrrolidino)-ethyl chloride, boiling at 96–97 degrees centigrade (uncorr.) under a pressure of 40 millimeters of mercury.

The hydrochloride, after crystallization from acetone, melted at 138–139 degrees centigrade (uncorr.).

*Preparation 9.—1-pyrrolidino-2-chloropropane*

Twenty-five and eight tenths grams of 1-pyrrolidinopropanol-2 was added to 57 milliliters of dry benzene containing 30.0 grams of thionyl chloride. The mixture was heated under reflux for two hours, after which it was allowed to stand for about sixteen hours, the crude pyrrolidinopropyl chloride hydrochloride filtered from the solvent, washed with dry benzene, then with acetone, and dried in vacuo. This material was dissolved in a minimum amount of water, filtered from insoluble matter, and the insoluble residue was washed with water. The combined aqueous solutions were basified with concentrated sodium hydroxide solution and extracted several times with ether. The combined ether extracts were dried over solid potassium hydroxide, the ether removed, and the residue distilled under reduced pressure to give 15.9 grams of 1-pyrrolidino-2-chloropropane, distilling at 90–91 degrees centigrade (uncorr.) under a pressure of 107 millimeters of mercury.

The hydrochloride melted at 188.5–189.5 degrees centigrade (corr.).

*Example 1.—N-[beta-(2,4-dimethylpyrrolidino)-propyl]-phenothiazine*

To a stirred suspension of 8.58 grams (0.22 mole) of sodium amide in 200 milliliters of dry toulene was added 39.8 grams (0.2 mole) of phenothiazine. The solution was heated under reflux for two hours, whereafter the suspension of the sodium salt of phenothiazine was cooled to room temperature. With continuous stirring, 26.7 grams (0.1 mole) of 1-(2',4'-dimethylpyrrolidino)-2-chloropropane (Preparation 7), dissolved in 100 milliliters of toluene, was added dropwise thereto. When addition was complete, the solution was heated under reflux, with stirring, for an additional 15 hours.

The product was cooled, shaken with dilute (3 N) hydrochloric acid. A brown oil which separated was dissolved by diluting the aqueous acid extract to about 2 liters. This aqueous solution was separated from the toluene and extracted once with ether to remove any unreacted phenothiazine. Ether which had dissolved in the water was removed by heating the solution, whereupon a white crystalline precipitate of N-[beta-(2,4-dimethylpyrrolidino)-propyl]-phenothiazine hydrochloride separated. This precipitate was filtered, dried, and crystallized from isopropanol, whereupon a pure product melting at 249–250 degrees centigrade (uncorr.) was obtained.

*Example 2.—N-[beta-(2,4-dimethylpyrrolidino)-ethyl]-phenothiazine*

In a manner identical with that of Example 1, there was obtained from 19.9 grams of phenothiazine, 4.29 grams of sodium amide, and 16.5 grams of beta-(2,4-dimethylpyrrolidino)-ethyl chloride (Preparation 6), 19.8 grams of N-[beta-(2,4-dimethylpyrrolidino)-ethyl]-phenothiazine hydrochloride melting at 160–162 degrees centigrade (uncorr.).

*Example 3.—N-[beta-(2,5-dimethylpyrrolidino)-ethyl]-phenothiazine*

By the procedure given in Example 1, there was obtained from the reaction of the sodium salt of phenothiazine and beta-(2,5-dimethylpyrrolidino)-ethyl chloride (Preparation 8), N-[beta-(2,5-dimethylpyrrolidino)-ethyl]-phenothiazine hydrochloride, melting, after crystallization from a mixture of isopropyl alcohol and isopropyl ether, at 194–196 degrees centigrade (uncorr.).

*Example 4.—N-(beta-pyrrolidinopropyl)-phenothiazine*

The sodium salt of phenothiazine was reacted with beta-pyrrolidinopropyl chloride after the manner of Example 1. The free base, obtained by extraction of the toluene solution with dilute hydrochloric acid followed by basification of the acid solution, was purified by distillation in a short-path pot still at a pressure of 0.2 millimeter of mercury. The light-yellow viscous distillate was dissolved in anyhdrous ether, to which was added a saturated solution of oxalic acid in ether. A gummy semi-solid, which was thus obtained, solidified after decantation of the ether and trituration with acetone. The N-(beta-pyrrolidinopropyl)-phenothiazine oxalate melted with decomposition at 181 degrees centigrade (uncorr.). Crystallization from 95 per cent ethanol gave small colorless needles with the same melting point.

Eight and one-tenth grams of the purified oxalate was added to 100 milliliters of water and the suspension basified with sodium hydroxide solution. The basic solution was extracted with ether; the ether extracts dried over anhydrous magnesium sulfate, filtered, and dry HCl gas passed over the surface of the ether solution. N-(beta-pyrrolidinopropyl)-phenothiazine hydrochloride precipitated. The precipitate was filtered and, when crystallized from a mixture of acetone and isopropyl ether, melted at 192.5–194.0 degrees centigrade.

*Example 5—N-[beta-(2,5-dimethylpyrrolidino)-propyl]-phenothiazine*

The reaction of the sodium salt of phenothiazine and beta-(2,5-dimethylpyrrolidino)-propyl chloride according to the method of Example 1 gave N-[beta-(2,5-dimethylpyrrolidino)-propyl]-phenothiazine which, after crystallization from methanol, treatment with activated charcoal, and two subsequent crystallizations from absolute ethanol, melted at 102–103 degrees centigrade (uncorr.).

Various modifications may be made in the invention without departing from the spirit or scope thereof, and it is to be understood that we limit ourselves only as defined in the appended claims.

We claim:

1. An N-(pyrrolidinoalkyl)-phenothiazine derivative of the group consisting of (a) compounds represented by the formula:

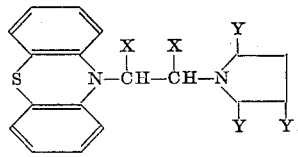

in which X is a radical of the group consisting of hydrogen and lower alkyl radicals and Y is a radical of the group consisting of hydrogen and methyl radicals, at least one of the said radicals X and Y being other than a hydrogen radical, and (b) acid addition salts and (c) quaternary ammonium salts of the said N-(pyrrolidinoalkyl)-phenothiazines.

2. A hydrochloride salt of an N-(pyrrolidinoalkyl)-phenothiazine as defined in claim 1.

3. A quaternary ammonium salt of an N-(pyrrolidinoalkyl)-phenothiazine as defined in claim 1.

4. A process for the preparation of an N-(pyrrolidinoalkyl)-phenothiazine represented by the formula:

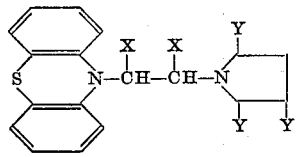

in which X is a radical of the group consisting of hydrogen and lower alkyl radicals and Y is a radical of the group consisting of hydrogen and methyl radicals, which comprises the condensation of phenothiazine in the presence of an alkaline condensing agent with an N-(pyrrolidinoalkyl)-halide represented by the formula

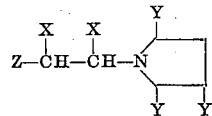

in which X and Y represent respectively the radicals hereinbefore defined, and Z is a halogen radical, and recovery of the N-(pyrrolidinoalkyl)-phenothiazine from the resulting product.

5. A process as defined in claim 4 in which the halogen radical (Z) is chlorine.

6. A process as defined in claim 4 in which the alkaline condensing agent is sodium amide.

7. A process as defined in claim 4 in which the condensation is effected in a liquid aromatic hydrocarbon solvent.

8. N-(beta-pyrrolidinopropyl)-phenothiazine.

9. N-[beta-(2,4-dimethylpyrrolidino)-ethyl]-phenothiazine.

10. N-[beta-(2,5-dimethylpyrrolidino)-propyl]-phenothiazine.

JAMES H. HUNTER.
WILLIAM BRADLEY REID, JR.

REFERENCES CITED

The following references are of record in the file of this patent:

UNITED STATES PATENTS

| Number | Name | Date |
|---|---|---|
| 2,406,594 | Djerassi et al. | Aug. 27, 1946 |

OTHER REFERENCES

Survey of Antimalarial Drugs by Frederick Y. Wiselogle, vol. 2, part I, page 699 (1946).